ns Research Company, fining pressures simulating those in deep formations.
United States Patent Office 3,376,930
Patented Apr. 9, 1968

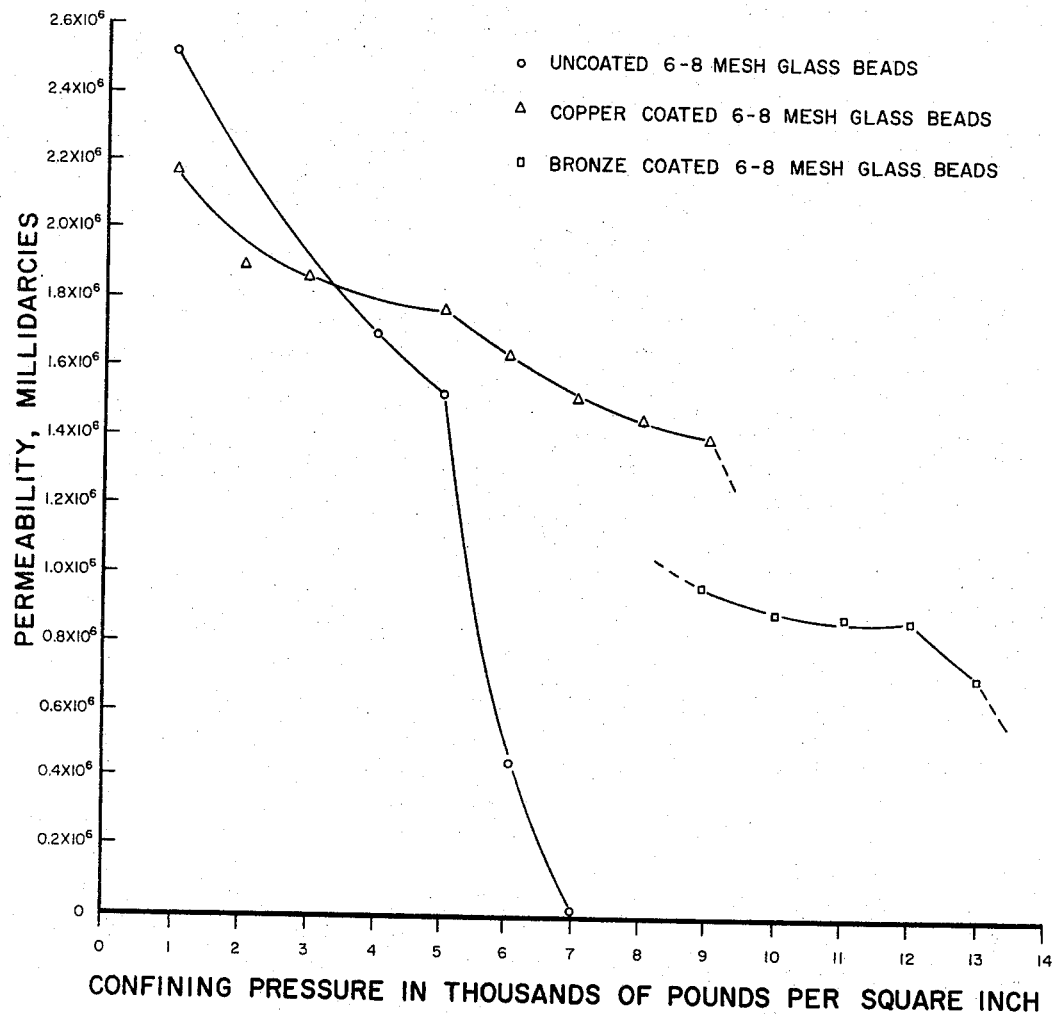

3,376,930
**METHOD FOR FRACTURING SUB-
TERRANEAN FORMATIONS**
Othar M. Kiel, Houston, and Joe K. Heilhecker, Bellaire,
Tex., assignors to Esso Production Research Company,
a corporation of Delaware
Filed May 20, 1966, Ser. No. 551,780
10 Claims. (Cl. 166—42)

ABSTRACT OF THE DISCLOSURE

Fractures in subterranean formations are propped with composite particles having cores of a frangible nonmetallic solid that fractures under high confining pressures without substantially elastic deformation and is substantially inert to formation fluids and at least partial outer coatings of a malleable metal substantially inert to formation fluids.

---

This invention relates to the fracturing of subterranean formations and is particularly concerned with the propping of fractures to secure high conductivities.

Hydraulic fracturing has been used extensively in the petroleum industry. This process generally involves the injection of an aqueous liquid, a hydrocarbon oil or an oil-water emulsion containing suspended sand grains, glass beads or similar solid particles into a well under sufficient pressure and at sufficiently high injection rates to break down the exposed formation. The suspended particles are carried into the induced fracture and, as the pressure declines, act as a propping agent to prevent complete closure. This results in the formation of a permeable channel through which injected or produced fluids may pass. The conductivity of this channel depends upon the width of the fracture and the permeability of the particles within it. The propping agents generally used give low permeabilities at high confining pressures and hence the fracture conductivities obtained are normally low. This limited conductivity has generally restricted the use of hydraulic fracturing to relatively shallow formations.

Various propping agents designed to provide better permeabilities at relatively high confining pressures have been suggested in the prior art. These include tempered glass beads, metallic shot, resin pellets and the like. Experience has shown that brittle materials such as the tempered glass beads, when used in multilayers, shatter at high pressures and produce fines which plug the pore spaces within the packed fracture. Similar but somewhat lower reductions in permeability are encountered due to the deformation of metallic shot and other malleable materials at elevated pressures. Even though the permeabilities obtained with these materials are generally better than those obtained with ordinary sand and similar propping agents, they are often too low to make the hydraulic fracturing of deep formations economically attractive.

In accordance with this invention, it has now been found that fractures with surprisingly high conductivities can be obtained by the use of certain composite materials as propping agents. Tests have shown that particulate solids which shatter under high confining pressures can be at least partially coated with metals which will deform slightly under such pressures and that the resulting particles retain their permeability at significantly higher confining pressures than do the uncoated solids. The use of such composite particles results in high conductivity fractures and may permit the application of fracturing to formations in which propping agents available in the past cannot be effectively employed.

The nature and objects of the invention can be best understood by referring to the following detailed description of the improved propping agents and their preparation and to the accompanying drawing showing the results of permeability measurements made under confining pressures simulating those in deep formations.

The particles which are at least partially coated with metal to obtain the improved propping agents of the invention are nonmetallic frangible solids which break without substantial elastic deformation under high confining loads and are substantially inert to the formation fluids. Suitable materials include quartz sand, glass beads, naturally occurring crystals of garnet and similar minerals, ceramic particles and similar relatively brittle materials. Tempered high strength glass beads are generally capable of withstanding somewhat higher confining pressures than are certain of the other frangible materials and are therefore particularly effective for purposes of the invention. The brittle particles used are generally between about 2½ and about 40 mesh, preferably between about 4 and about 20 mesh, on the U.S. Standard Sieve Series scale in size. The size range chosen will depend in part upon the density of the particles and the viscosity of the fracturing fluid in which they are to be used and may be varied as necessary. Relatively large particles falling within a narrow size range are preferred and hence particles of from about 4 to 6 mesh, 6 to 8 mesh, 8 to 12 mesh, or 10 to 20 mesh will generally be used.

The metals applied to the brittle particles in preparing the improved propping agents should also be substantially inert to the formation fluids and should have the ability to deform without shattering under the confining loads encountered in hydraulic fracturing operations. Suitable materials include the malleable metals such as copper; copper alloys such as brass and bronze; aluminum and aluminum alloys; lead; stainless steel; zinc and the like. These metals may be applied to the brittle particles in liquid or vapor form so that a thin metallic film is obtained or may be bonded to the surfaces of the particles in the form of finely divided powder granules. Composite particles prepared with the powder granules are generally less expensive than those prepared by other methods and hence their use is preferred.

An effective method for bonding the metallic powder granules to the brittle materials which serve as cores for the composite particles is to first wet the particles of sand, glass or similar material with an adhesive which is not readily soluble in the formation fluids after it dries. Suitable materials include shellac; polyisobutylene, cellulose and nitrocellulose lacquers; drying oils; paint vehicles; waterproof glues; epoxy solutions; varnishes and the like. Only a small amount of the adhesive is generally required. The powdered metal is then mixed with the wetted particles in a quantity sufficient to coat them and prevent their sticking together. Powder granules less than about 200 mesh on the U.S. Standard Sieve Series scale, preferably less than about 325 mesh in size, are generally used. As the adhesive dries, it bonds the granules in place to form composite particles coated at least in part with a thin layer of metal. The thickness of this metallic coating will generally be on the order of from about 0.0005 to about 0.025 inch, depending upon the size of the powder granules employed. Very fine powders are generally used with small particles of sand, glass or the like; while coarser granules may be utilized with the larger particles. Generally speaking, the metallic coating will not materially alter the size of the brittle particles and thus the composite particles will fall within the 2½ to 40 mesh size range specified earlier.

It will be understood that methods other than that described above may be employed for at least partially coating the brittle particles with metal. Vapor deposition, electrodeposition and similar techniques are satisfactory but are generally more expensive than the preferred method using metallic powder.

As pointed out earlier, the composite propping agents of the invention give surprisingly higher permeabilities at elevated confining pressures than do the propping agents employed in the past. This is shown by the results of permeability tests carried out with various propping agents at simulated confining pressures up to 13,000 pounds per square inch. In each test, a layer of propping agent one-half inch deep was packed into a pressure cell containing a rectangular cavity 2 inches wide and 10 inches long. A rubber gasket was placed on top of the propping agent and an aluminum piston was inserted above the gasket. The assembled cell was placed in a high pressure testing machine and loaded to provide the desired confining pressure on the propping agent. A refined oil with a viscosity of 61.7 centipoises was then pumped through the material by means of taps connected to each end of the cell. The pressure drop across the packed propping agent was measured by means of pressure gauges and the permeability values were calculated from the data thus obtained.

The first propping agent tested in the manner described above consisted of 6 to 8 mesh high strength glass beads. The results obtained are shown in the drawing. It was found that the glass beads gave high permeabilities at low confining pressures but that the permeability values decreased rapidly as the pressure was increased. This reduction in permeability is apparently caused by compaction of the beads and the shattering of beads to form fragments which plug the pore spaces. At a pressure of about 5,000 pounds per square inch, severe crushing of the beads took place. At a fracture gradient of 0.8 pound per foot of overburden, this corresponds to a depth of about 6,200 feet. The permeability at 6,000 pounds per square inch was only 455,000 millidarcies and at 7,000 pounds per square inch had dropped to 65,000 millidarcies. This illustrates the difficulties encountered in using conventional glass beads for fracturing deep formations. The permeabilities of the packed fractures are so low that satisfactory conductives are difficult to obtain. Except in formations where the rock permeability is exceptionally low or severe damage exists adjacent the well bore, there has been little incentive for fracturing such wells.

Following the tests of the uncoated glass beads as described above, composite particles were prepared by coating 6 to 8 mesh high strength glass beads with finely divided copper powder less than about 325 mesh in size. The beads to be coated were first wetted with a vehicle used for suspending such powder in metallic paints. The vehicle consisted of about 35% of a fatty glyceride and about 65% of a thinner and was used in a quantity just sufficient to wet the beads. The wet beads were thoroughly mixed with copper powder so that each bead was coated with fine grains of copper metal which prevented the beads from sticking together as the vehicle dried. After the beads were completely dry and the powder had thus been bonded in place, they were placed in the pressure cell and tested in the manner described earlier. As indicated in the drawing, the copper coated beads gave a slightly lower permeability at the initial confining pressure of 1,000 pounds per square inch. As the pressure was increased, however, the reduction in permeability was less pronounced than in the case of the uncoated beads. At a confining pressure of 5,000 pounds per square inch, the coated beads gave a somewhat higher permeability than that obtained with the uncoated beads. Severe crushing of the coated beads did not occur until the confining pressure reached about 9,000 pounds per square inch. Thereafter, the permeability decreased rapidly in much the same way that it had with the uncoated beads in the earlier tests. It can be seen that the presence of the copper on the surfaces of the beads nearly doubled the pressure range over which permeabilities in excess of about 1 million millidarcies were obtained. This facilitates the creation of high conductivity fractures in deep wells and may permit the fracturing of formations which could not be economically fractured otherwise.

In a further test, composite particles were prepared by coating 6 to 8 mesh high strength glass beads with a liquid vehicle and then applying finely divided bronze powder in the manner described above. Permeability measurements were made at confining pressures of from 9,000 to 13,000 pounds per square inch. It was found that the bronze coated particles had a permeability of about 980,000 millidarcies at the initial 9,000 p.s.i. pressure. This was slightly lower than the value obtained with the copper coated beads at a similar pressure and may have been due to a slight difference in the amount of powdered metal applied to the beads. The use of a greater quantity of the metal powder or large powder granules normally reduces the permeability somewhat but may improve the ability of the particles to withstand high confining pressures. As indicated in the drawing, the bronze coated beads gave permeabilities of about 883,000 millidarcies at pressures up to about 12,000 pounds per square inch. The coated beads failed at a pressure between 12,000 and 13,000 pounds per square inch and thereafter the permeability declined. Here again it can be seen that the metallic coating resulted in significantly higher permeabilities at elevated pressures than were obtained with the uncoated beads.

The composite propping agents of the invention generally require no special equipment or handling techniques. In a typical application, a packer is first set near the lower end of the tubing string to isolate the formation to be fractured. The propping agent is then suspended in a viscous oil-base or water-base fracturing fluid in a concentration of about 3 pounds per gallon or higher and pumped into the well through the tubing at a high rate. As the formation fractures, the pressure will generally show a sharp drop. Thereafter, pumping is continued at a high rate to extend the fracture and deposit the propping agent. After the desired quantity of fracturing fluid has been injected, the well may be shut in. As the pressure decreases, the fracture closes on the suspended particles. These form a permeable channel within the fracture through which later injected or produced fluids may pass. The viscosity of the injected fracturing fluid is decreased by dilution with fluids from the formation and may be withdrawn by backflowing the well. Various modifications of this method, including the use of a fluid free of propping agent to break down the formation initially, the injection of the propping agent to form a partial monolayer, the use of an afterflush, and the use of other types of treatment in combination with the fracturing operation, may be employed.

What is claimed is:

1. In a method for propping open a fracture in a subterranean formation surrounding a wellbore, the improvement which comprises injecting into said fracture a fluid suspension of composite particles having cores of a frangible nonmetallic solid that fractures under high confining pressures without substantial elastic deformation and is substantially inert to formation fluids and at least partial outer coatings of a malleable metal substantially inert to formation fluids.

2. A method as defined by claim 1 wherein said coating comprises powder granules of said malleable metal.

3. A method as defined by claim 1 wherein said nonmetallic solid is glass.

4. A method as defined by claim 1 wherein said coating is between about 0.0005 and about 0.025 inch thick.

5. A method as defined by claim 1 wherein said nonmetallic solid is sand.

6. A method as defined by claim 1 wherein said composite particles are glass beads having metal powder granules bonded to their outer surfaces.

7. A method as defined by claim 6 wherein said powder granules are less than about 325 mesh in size.

8. A method as defined by claim 1 wherein said malleable metal comprises copper.

9. A method as defined by claim 1 wherein said malleable metal comprises aluminum.

10. A method as defined by claim 8 wherein said malleable metal is bronze.

References Cited

UNITED STATES PATENTS

| | | |
|---|---|---|
| 2,424,083 | 7/1947 | Finch et al. _____ 252—454 XR |
| 2,424,085 | 7/1947 | Bergsteinsson et al. 252—454 XR |
| 2,459,896 | 1/1949 | Schwarz _____ 252—454 XR |
| 2,763,696 | 9/1956 | Finch et al. _____ 252—457 XR |
| 2,861,983 | 11/1958 | Fotis _____ 252—454 XR |
| 3,155,162 | 11/1964 | Flickinger et al. _____ 166—42 |
| 3,175,615 | 3/1965 | East et al. _____ 166—42 |
| 3,237,693 | 3/1966 | Huitt et al. _____ 166—42 |
| 3,242,032 | 3/1966 | Schott _____ 166—42 X |

STEPHEN J. NOVOSAD, *Primary Examiner.*